Nov. 26, 1968   J. A. DE NAPLES, JR., ET AL   3,412,991
REPRODUCIBLE POSITION PLATFORM
Filed July 28, 1966
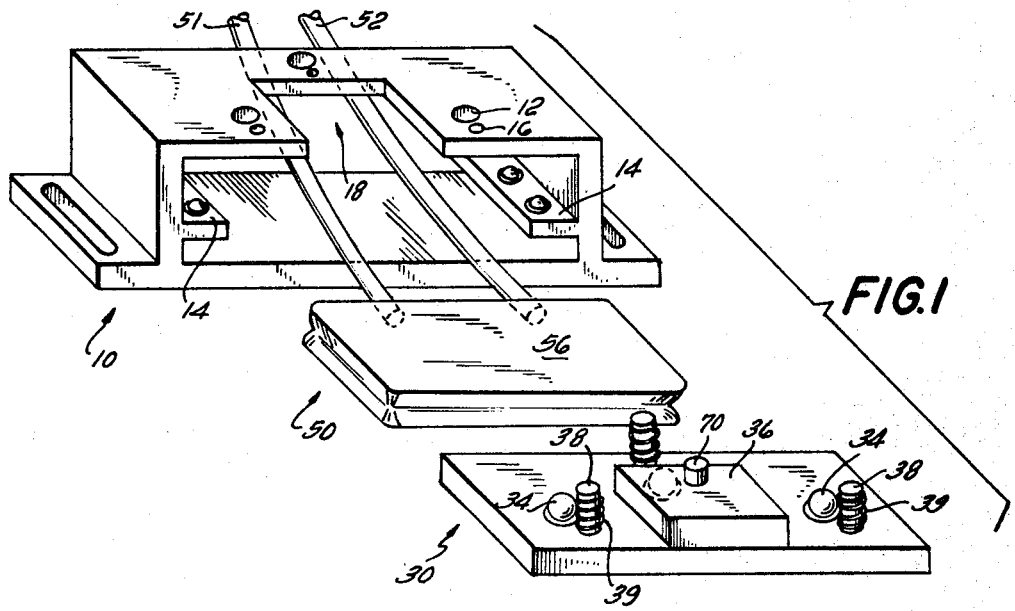
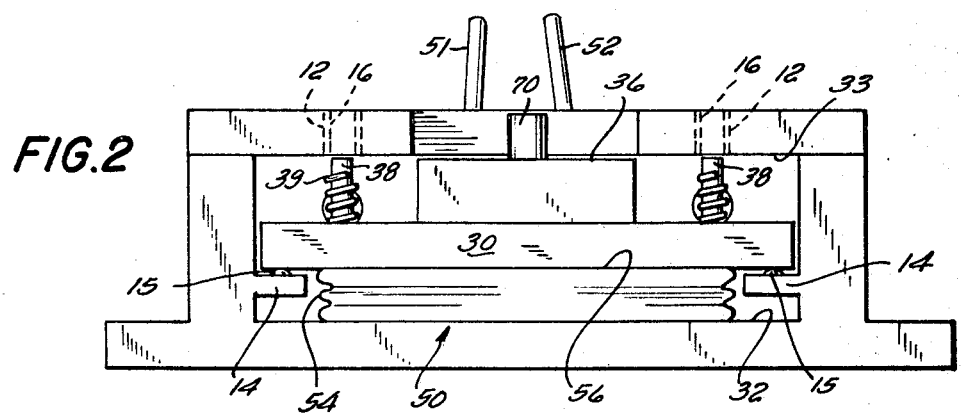
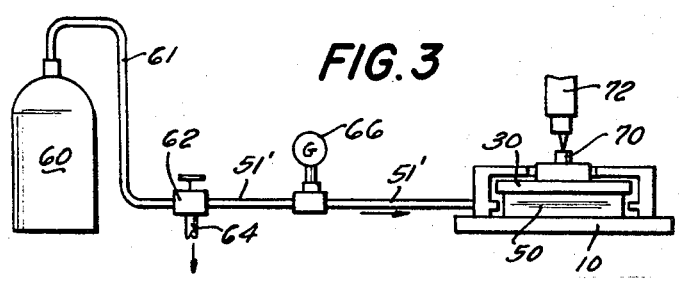
INVENTORS
J. B. P. WILLIAMSON
J. A. DeNAPLES JR.
R. T. HUNT
BY *Howard A. Reiter*
ATTORNEY United States Patent Office 3,412,991
Patented Nov. 26, 1968

3,412,991
REPRODUCIBLE POSITION PLATFORM
John Anthony De Naples, Jr., Stamford, and Richard Terence Hunt and John Brian Peter Williamson, Wilton, Conn., assignors to Burndy Corporation, a corporation of New York
Filed July 28, 1966, Ser. No. 575,912
4 Claims. (Cl. 269—35)

ABSTRACT OF THE DISCLOSURE

An inflatable bladder-like device, interposed between a base and a moveable platform, can be inflated to raise the platform above the base into a precisely-known position. The position of the platform relative to the base is determined by cooperating ball-and-socket alignment guides. When the alignment guides are disengaged, the platform can be removed from the base without disturbing the location of the base relative to other objects.

---

This invention relates to support fixtures for positioning articles relative to a piece of test equipment or similar apparatus, and is particularly related to such fixtures which are adapted to provide precise relocation of an article in a given position.

Various areas of scientific activity today require the use of testing and measuring instruments which relay on the physical position of a test specimen for the derivation of meaningful data. The investigation of surface, and surface coating parameters, is a typical application of such instruments. In the ordinary course of work of this kind, it is often necessary to remove a specimen from a given test location and to then return it after further use or testing has occurred alsewhere. Under these circumstances, highly precise relocation of the test specimen relative to the measuring instrument is required to assure consistent accuracy of results.

Prior to this invention, reproducing a prior test specimen location has generally been a tedious, time consuming, and often imprecise operation, which required manual skill and specially fitted supports.

Accordingly, it is an object of this invention to provide a support platform for test specimens which can be simply and easily removed from, and relocated in, a given position relative to a given base element.

Another object of this invention is to provide a support platform which does not require special operator training.

Still another object of this invention is the provision of a support platform which can be selectively seated in a given position with a known seating force.

These, and further objects and advantages of this invention will be particularly pointed out and distinctly set forth in the following specification and claims as explained in conjunction with the accompanying drawings, in which:

FIGURE 1 is a pictorial representation of the salient features of a reproducible position platform constructed in accordance with this invention, and shown in disassembled form;

FIGURE 2 is a front elevation view of the platform of FIGURE 1 in assembled form; and FIGURE 3 is a schematic drawing of a system embodying the platform of FIGURE 1.

Referring now more particularly to the drawings, the specimen platform device illustrated in FIGURE 1 may be seen to comprise a base element indicated generally by reference numeral 10, a platform element similarly indicated at 30 and an activating means 50 in the form of an inflatable bladder adapted to be used for moving platform 30 relative to base 10.

FIGURE 2 illustrates that the assembled position of platform 30 lies between the opposed inner surfaces 32, 33 of base 10. Activating bladder 50 is interposed between platform 30 and lower surface 32 in position to move the platform toward opposed surface 33.

Surface 33 is used as a reference plane for positioning the platform relative to the base. The platform 30 can be seen in FIGURES 1 and 2 to include a plurality of positioning plug projections 34 which are in effect spherically surfaced objects mounted in fixed position to the platform 30. To position the platform relative to surface 33, the latter is provided with a plurality of receptacles in the form of circular bores 12 which are located in alignment with plugs 34. The diameter of each bore 12 is less than the diameter of the corresponding aligned plug 34 so that the plugs can be inserted no more than part way into the corresponding bores. Thus, as platform 30 is moved toward surface 33, spherical plugs 34 will enter and seat themselves within the circular openings formed by bores 12 in surface 33. The self-centering effect of a given diameter sphere seated in a circular opening of known diameter will then cause platform 30 to relocate in the same precise location relative to surface 33 of base 10 each time plugs 34 are engaged with seating bores 12.

Although plugs 34 have been described as being mounted to platform 30, it should be noted that a permanent or securely fastened mounting is not essential. It is merely necessary for them to be located in a precise position relative to the specimen-carrying surface 36 of the platform. This requirement may be readily met by forming plug elements 34 as complete spherical bodies, and providing platform 30 with circular seats (not shown) akin to those provided by seating bores 12.

In the embodiment herein illustrated, activating means 50 is shown to be in the form of an inflatable bladder. The bladder is provided with a fluid pressure input line 51 and a pressure relief or "return" line 52. Application of pressure to the bladder through line 51 will cause it to inflate, expanding the accordion folds 54 shown in FIGURE 2 and moving platform 30 upward away from base surface 32 toward reference surface 33. Continued movement in this manner will finally cause plugs 34 to seat within the entrances to bores 12 thereby positioning platform 30 relative to base 10 as has been previously described. The pressure within the bladder 50 may be selectively relieved, or returned to a central reservoir, through line 52 whenever it is desired to retract platform 30 from its "seated" position to the "lowered" or "withdrawn" position shown in FIGURE 2.

Although it would be possible to employ other activating means, for example, a hydraulic cylinder mechanism or a solenoid, the bladder here illustrated offers the advantage of applying lifting pressure uniformly over a large surface portion of platform 30. Distribution of pressure in this manner reduces the effects of uneven force application and possible consequent deformation of the locating platform. Moreover, if bladder 50 is provided with a platform-engaging surface 56 of known and relatively stable area, it is apparent that the total lifting and seating force transmitted to platform 30 may be accurately determined by measuring the pressure within the bladder. Knowledge of the exact seating force applied to the platform by the bladder will make possible still more accurate removal and relocation operations.

A complete assembly for accurately determining and controlling the pressures and forces applied in the operation of such a platform device is illustrated in FIGURE 3. That assembly may be seen to comprise a central source of fluid pressure 60 which is coupled by a fluid passage 61 to a selectively operable valve 62. The valve is in turn provided with an output line 51' and an exhaust port 64.

By manipulation of the valve, pressure from source 60 may be transmitted to activating means 50 in the device which includes platform 30 and base 10, or pressure in the activating means may be exhausted through port 64. A pressure gauge 66 coupled to line 51' will permit an operator to readily determine the pressure being transmitted as it is controlled by valve 64.

To further facilitate operation of a platform device in accordance with this invention, the base 10 may be provided with auxiliary supporting means such as slide-tracks 14 for supporting platform 30 in spaced relation from surface 32. This will permit bladder 50 to be retracted out of engagement with platform 30 in the withdrawn position. The platform, together with a mounted specimen 70 may then be conveniently removed to another location without disturbing the relationship between the base 10 and a specimen test instrument 72, as shown in FIGURE 3. Roller casters 15 or similar glide devices, may be placed on the surface of tracks 14 to simplify insertion and withdrawal of the platform. In addition, base 10 may be provided with a three-sided opening 18 in surface 33 to allow removal of any height specimen on platform 30 without interference.

To still further enhance operation and help assure proper seating, base 10 and platform 30 may be provided with intermating guide sockets 16 and guide posts 38 respectively. The diameter of the sockets 16 should preferably be sufficiently greater than posts 38 to permit the platform to shift transversely to the posts while plugs 34 are being seated. As shown in FIGURES 1 and 2 resilient members such as compression springs 39 may be interposed between platform 30 and reference plane 33 on base 10 for lightly resisting the force of bladder 50 so as to steady platform 30 as it is moved from withdrawn to seated position.

The invention has thus been described, but it is desired to be understood that it is not confined to the particular forms or usages shown and described, the same being merely illustrative, and that the invention may be carried out in other ways without departing from the spirit of the invention; therefore, the right is broadly claimed to employ all equivalent instrumentalities coming within the scope of the appendant claims, and by means of which objects of this invention are attained and new results accomplished, as it is obvious that the particular embodiments herein shown and described are only some of the many that can be employed to obtain these objects and accomplish these results.

We claim:

1. A specimen supporting platform assembly for locating a specimen in a precisely reproducible position relative to a given base, comprising:

a base element;

a specimen platform element movable with respect to said base;

a plurality of cooperating positioning elements mounted in fixed positions on said base element and said platform element for locating said platform with respect to said base;

said cooperating positioning elements comprising plug elements having substantially spherical surface portions thereon, and receptacle elements having substantially circular seating portions for receiving and cooperatively engaging the substantially spherical surface portion of said plug elements;

activating means coupled to said base in position to act upon said platform for moving said platform element from a first position relative to said base element to a second position and therein urging the positioning elements on said platform element into cooperating engagement with the positioning elements on said base element; and said activating means comprising an inflatable bladder member, positioned between said base element and said platform element, which permits floating relative movement between the two said elements, and which may be selectively inflated with a pressure transmitting fluid to move said platform between said first position and said second position relative to said base.

2. The supporting platform assembly of claim 1 further including resilient compression elements interposed between said platform element and said base element in position to exert a relative force therebetween in one direction which is adapted to be overcome by the force of said activating means acting in the opposite direction.

3. The supporting platform assembly of claim 1 further including supporting means coupled to said base element for supporting said platform element in separable relation thereto in position to be acted upon by said activating means.

4. The supporting platform assembly of claim 1 further including a source of fluid under pressure for supplying fluid to said bladder member; and means including valve means for controlling and determining the fluid pressure supplied to said inflatable bladder member.

References Cited

UNITED STATES PATENTS 1,745,959  2/1930  Steiner _____ 254—93
3,284,884  11/1966  Prazak _____ 29—407 X ROBERT C. RIORDON, *Primary Examiner.*

J. F. McKEOWN, *Assistant Examiner.*